April 5, 1955   L. G. SAYWELL   2,705,654
SEALING ASSEMBLY
Filed July 20, 1949
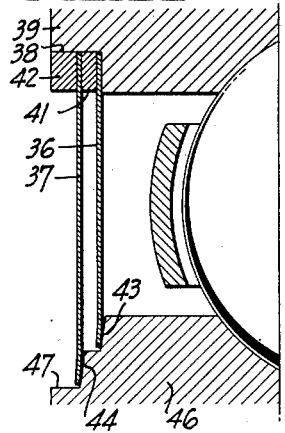
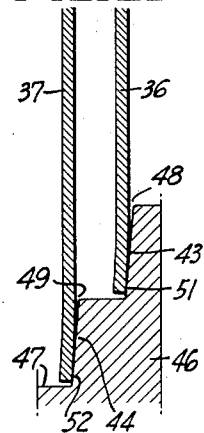
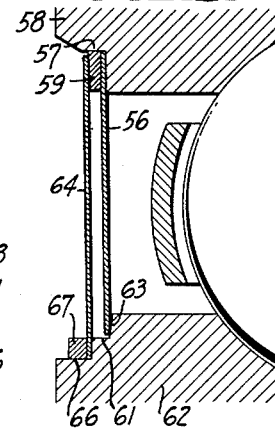
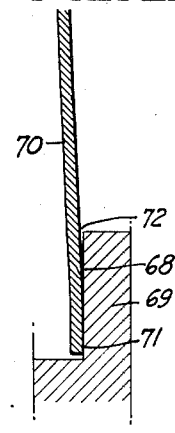
*INVENTOR.*
*Lawrence G. Saywell*
BY
*ATTORNEYS*

United States Patent Office 2,705,654
Patented Apr. 5, 1955

2,705,654

SEALING ASSEMBLY

Lawrence G. Saywell, San Mateo, Calif., assignor to Saywell Associates, South San Francisco, Calif., a joint venture Application July 20, 1949, Serial No. 105,760

1 Claim. (Cl. 286—11)

This invention relates generally to lubricant sealing assemblies, and particularly assemblies adapted to seal against the more viscous lubricants, such as various greases.

In my Patent No. 2,428,041 there is disclosed a lubricant sealing assembly making use of a plurality of spring metal annuluses, which are arranged to seal between outer and inner relatively rotatable parts, such as between a rotating shaft and its surrounding bearing housing. In one form of the assembly disclosed in said patent (see Figure 9) four such spring metal annuluses are employed, and they are arranged with two outer annuluses being sealed with respect to the housing, and the other two annuluses sealed with respect to the shaft and having their outer peripheral margins in overlapping and sealing relation with the inner margins of the outer annuluses. Such seals are particularly adapted for use with various types of fluid lubricating oils, and may be applied to shaft-bearing assemblies, or mounted directly on the races of ball or roller bearing assemblies.

It is an object of the present invention to provide a novel sealing assembly which is particularly adapted for use with the more viscous lubricants, including the common varieties of greases.

It is a further object of the invention to provide a novel sealing assembly which is relatively simple in construction, and which can be incorporated directly with ball or roller bearing assemblies without undue manufacturing cost.

Further objects of the invention will appear from the following description in which the preferred embodiments of the invention have been set forth in detail in conjunction with the accompanying drawing.

Referring to the drawing:

Figure 1 is an enlarged cross sectional view illustrating one embodiment of my invention applied to a ball bearing assembly.

Figure 2 is an enlarged cross sectional detail illustrating the relationship between the two spring metal annuluses of Figure 1, and their associated shoulders.

Figure 3 is a view like Figure 1 illustrating another embodiment of the invention.

Figure 4 is an enlarged cross sectional detail illustrating a modification of the invention applicable to the two embodiments illustrated.

The assembly shown in Figures 1 and 2 employs two spring metal annuluses 36 and 37. The outer margins of these annuluses are shown accommodated in the annular recess 38, formed in the outer ball bearing race 39. They are held apart by the spacer ring 41, and they are clamped in sealing relation to the outer race by the pressed in retainer ring 42.

The inner margins of the annuluses 36 and 37 engage the annular shoulders 43 and 44, which are formed to different diameters on the inner ball bearing race 46. The recess 47, in which the annulus 37 is accommodated, has its peripheral surface in close opposition to the inner peripheral edge of the annulus 37. The annuluses 36 and 37 engage the shoulders 43 and 44 whereby there is normally a slight spacing in the regions 48 and 49, while for the regions 51 and 52, the loading is maximum. In order to secure this relationship the shoulders 43 and 44 can be formed on a bevel as illustrated in Figure 2.

Both of the annuluses are formed of suitable spring metal, such as high carbon blue spring steel, Phosphor bronze, or a suitable stainless steel. It should be sufficiently thin to provide lateral flexibility. For example it may range from 0.003 to 0.006 inch in thickness, for the sealing assemblies of the more common type. As installed in the ball bearing assembly the annuluses are stressed laterally within their elastic limits, so that their margins are continuously urged into sealing engagement with corresponding shoulders. The normal relationship between the annuluses, the shoulders 43 and 44, and the recess 47, is more clearly illustrated in Figure 2. It will be noted that the shoulders 43 and 44 are formed on a slight bevel, which in a typical instance may be of the order of from 3 to 6° with respect to a plane at right angles to the axis of the bearing assembly. By virtue of the force urging the inner margin of each annulus against its corresponding shoulder, this portion of the annulus may be bent or dished somewhat as illustrated in Figure 2. The net result of this relationship is to form inter-face contact areas between each annulus and the face of the corresponding shoulder, which is of substantial radial extent, and which forms an effective lubricant seal. Normally a very thin film of lubricant exists in the sealing areas and serves to minimize friction between the adjacent surfaces.

Normally the loading between each annulus and the face of the corresponding shoulder, that is, the pressure per unit area, is greatest at the peripheral edge of the annulus, in the regions 51 and 52. The loading decreases outwardly whereby in the regions 48 and 49, there is a slight spacing. The amount of such spacing is selected in accordance with characteristics of the particular ball bearing assembly with which the seal is installed. As is well known to those familiar with ball bearing assemblies, they are constructed to provide a certain predetermined amount of radial movement between the outer and inner races. The spacing at 48 and 49 is selected so that over the permissible limits of axial movement between the races, the region of maximum loading does not shift from regions 51 and 52 to regions 48 and 49. Thus it is desirable to provide very small spacings at 48 and 49 for both limiting positions of the races. Because the radial dimensioning of each annulus is considerably greater than that of the corresponding shoulders, the spacing at 48 and 49 can normally be less than the total permissible axial movement between the races. For example when the total axial movement between the outer and inner ball bearing races is of the order of 0.007 inch, the spacing at 48 and 49 can be selected so that it will range from say 0.002 to 0.006 inch, depending upon the positioning of the races.

Another relationship which is illustrated in Figures 1 and 2, and which is desirable, is the fact that the inner diameter of the annulus 37 is only slightly greater than the diameter of the recess 47. Thus the inner peripheral edge of the annulus 37 is brought into relatively close apposition with the adjacent peripheral surface of the recess 47, as shown more clearly in Figure 2. In the more common types of ball bearing assemblies this clearance can be of the order of from 0.010 to 0.025 inch, and in any event it should be slightly greater than the permissible radial movement between the ball bearing races. The purpose of this close apposition is to form a protection against entrance of dust and other foreign material, which would otherwise tend to find its way into the area of inter-face contact.

With the assembly such as illustrated in Figures 1 and 2, the outer annulus 37 may serve principally as a dust shield, while the inner annulus 36 serves primarily to prevent loss of lubricating grease. Since shoulder 44 may have a relatively small amount of lubricant, compared to shoulder 43, it is desirable to provide less loading for the annulus 37, than for the annulus 36. This can be accomplished either by providing less lateral deflection for stressing the annulus 36, or by forming the annulus 37 out of material of lesser thickness than annulus 36. Thus as a typical example annulus 37 can be formed of spring steel of about 0.003 inch, while annulus 36 can be of the same material but 0.005 inch thick.

Figure 3 illustrates another embodiment of the invention in which two spring metal annuluses are employed. Thus in this instance the annulus 56 is accommodated in the annular recess 57, formed in the outer ball bearing race 58. A pressed in retainer ring 59 serves to form a mounting for the annulus 56, and to prevent leakage between the same and the outer race. The inner margin of the annulus 56 is accommodated within an annular recess 61, which is formed in the inner ball bearing race 62. Also the inner margin of annulus 56 is urged against the annular shoulder 63. The second spring metal annulus 64 is accommodated within the recess 66, formed in the ball bearing race 62. It is securely attached to the inner ball bearing race by the pressed in retainer ring 67. The outer peripheral margin of the annulus 64 is urged into sealing engagement with the outer face of the retainer ring 59. The rigid shoulders which engage the margins of the annuluses are formed in such a manner as to maintain sealing engagement at their peripheral edges, for the entire range of permissible axial movement between the inner and outer ball bearing races. Here again the outer annulus 64 may perform primarily the function of a dust seal, and it may be arranged to press more lightly against the outer face of the retainer ring 59.

In the embodiments described above reference has been made to forming the sealing shoulders on a slight bevel, in order to form at all times a proper cooperating sealing relation with the occasional overlapping margin of the spring metal annulus. In place of forming the shoulders on a distinct bevel it is possible to form these shoulders in a plane at right angles to the axis of the bearing assembly, and to employ normally dished spring metal annuluses. Thus as shown in Figure 4, the shoulder 68 on the inner annulus 69 is in a plane at right angles to the axis of the bearing assembly, and engages the outer margin of the normally dished spring metal annulus 70. The dishing of the annulus 70 is such that when installed in the bearing assembly, and stressed toward flat or planar condition, the maximum loading will be provided in the region 71, while permitting a slight spacing in the region 72.

It is desirable to coat one or both faces of the annuluses with a thermally set synthetic resin as disclosed in my applications Serial No. 772,486, filed September 6, 1947, now abandoned, and Serial No. 39,822, filed July 20, 1948, now U. S. Patent 2,581,301 issued January 1, 1952. Such a coating can be applied to any of the embodiments previously described.

I claim:

In a lubricant seal for sealing between two spaced and relatively rotatable concentric parts, two imperforate annuluses formed of relatively thin spring metal and extending between said parts, one of said annuluses having a width as measured in a radial direction which is greater than the other, two rigid annular stepped shoulders formed on the inner of said parts, each of said annuluses having one margin of the same in overlapping relation with a corresponding shoulder, means for securing one margin of each annulus to one of said parts, one annulus having its outer margin secured to the outer part and its inner margin in rubbing engagement with the larger one of said stepped shoulders, the other annulus having its inner margin secured in fixed relation with the smaller one of said stepped shoulders and having its outer margin in rubbing engagement with the shoulder formed on the outer part, each of said annuluses being stressed laterally within its elastic limit to provide a spring loading serving to urge its free margin into sealing rubbing engagement with one of said parts, thereby forming a seal, the annulus of lesser width providing a seal serving primarily to prevent leakage of lubricant, and the annulus of greater width providing primarily a dust seal.

References Cited in the file of this patent
UNITED STATES PATENTS

| | | |
|---|---|---|
| 1,511,868 | Asbury | Oct. 14, 1924 |
| 1,560,669 | Dennedy | Nov. 10, 1925 |
| 1,891,706 | DeRam | Dec. 20, 1932 |
| 1,892,332 | Des Roches | Dec. 27, 1932 |
| 2,067,464 | Smith | Jan. 12, 1937 |
| 2,428,041 | Saywell | Sept. 30, 1947 |
| 2,467,049 | Peterson | Apr. 12, 1949 |

FOREIGN PATENTS

| | | |
|---|---|---|
| 11,787 | Great Britain | of 1908 |